United States Patent
Eistein et al.

(10) Patent No.: US 10,193,592 B2
(45) Date of Patent: Jan. 29, 2019

(54) TECHNIQUES FOR DETECTING AND CANCELLING INTERFERENCE IN WIRELESS COMMUNICATIONS

(71) Applicant: QUALCOMM Incorporated, San Diego, CA (US)

(72) Inventors: Yaniv Eistein, Tel Aviv (IL); Arthur Gubeskys, San Diego, CA (US); Assaf Touboul, Netanya (IL); Eran Richardson, Petach Tikva (IL)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 15/157,191

(22) Filed: May 17, 2016

(65) Prior Publication Data

US 2017/0214429 A1    Jul. 27, 2017

Related U.S. Application Data

(60) Provisional application No. 62/298,254, filed on Feb. 22, 2016, provisional application No. 62/281,774, filed on Jan. 22, 2016.

(51) Int. Cl.
*H04B 1/7107* (2011.01)
*H04B 1/10* (2006.01)
(Continued)

(52) U.S. Cl.
CPC ....... *H04B 1/71072* (2013.01); *H04B 1/1027* (2013.01); *H04J 11/004* (2013.01);
(Continued)

(58) Field of Classification Search
CPC .......................... H04B 1/71072; H04B 1/1027
See application file for complete search history.

(56) References Cited

U.S. PATENT DOCUMENTS

2005/0008092 A1 *  1/2005  Kadous ................. H04L 1/0618
                                                                    375/267
2008/0219388 A1 *  9/2008  Oteri ................... H04L 25/0328
                                                                    375/348
(Continued)

FOREIGN PATENT DOCUMENTS

CN       103427894 A   * 12/2013
WO    WO-2014/204171 A1    12/2014
WO    WO-2015/005609 A1     1/2015

OTHER PUBLICATIONS

Pulin Patel and Jack Holtzman, Analysis of a Simple Successive Interference Cancellation Scheme in a DS/CDMA System, IEEE Journal on Selected Areas in Communications, vol. 12, No. 5, Jun. 1994.*

(Continued)

*Primary Examiner* — Hassan Kizou
*Assistant Examiner* — Deepa Belur
(74) *Attorney, Agent, or Firm* — Arent Fox, LLP

(57) ABSTRACT

Various aspects described herein relate to cancelling interference in wireless communications. Energy level detection of a received signal can be performed to determine an allocation size and position corresponding to an interfering device in the received signal. An interference demodulation reference signal (DM-RS) and cyclic shift of the interfering device in the received signal can be determined. It can be determined whether to apply successive interference cancellation on the received signal, based at least in part on the allocation size and position and the DM-RS and cyclic shift, to cancel interference from the interfering device.

30 Claims, 8 Drawing Sheets

(51) Int. Cl.
*H04L 5/00* (2006.01)
*H04W 92/20* (2009.01)
*H04J 11/00* (2006.01)
*H04L 27/26* (2006.01)

(52) U.S. Cl.
CPC ........ *H04J 11/0026* (2013.01); *H04L 5/0048* (2013.01); *H04L 27/261* (2013.01); *H04W 92/20* (2013.01)

(56) References Cited

U.S. PATENT DOCUMENTS

| | | | |
|---|---|---|---|
| 2012/0099446 A1* | 4/2012 | Su | H04L 1/0003 370/252 |
| 2014/0044107 A1* | 2/2014 | Jacob | H04B 1/1027 370/336 |
| 2014/0128115 A1* | 5/2014 | Siomina | H04L 1/0015 455/501 |
| 2014/0269246 A1 | 9/2014 | Yoo et al. | |
| 2014/0341320 A1* | 11/2014 | Hua | H04B 7/0417 375/299 |
| 2015/0264670 A1 | 9/2015 | Lee et al. | |
| 2015/0280775 A1 | 10/2015 | Xu et al. | |
| 2016/0013903 A1 | 1/2016 | Kim et al. | |
| 2016/0105257 A1* | 4/2016 | Jiao | H04L 1/0048 375/148 |
| 2016/0119071 A1* | 4/2016 | Sagong | H04J 11/005 455/452.1 |
| 2016/0191115 A1* | 6/2016 | Sano | H04W 16/28 375/144 |
| 2017/0099174 A1* | 4/2017 | Kim | H04L 27/2613 |

OTHER PUBLICATIONS

Omar Abu-Ella, Misurata University; Mohammed Elmusrati, University of Vaasa; Conference Paper Sep. 2015 DOI: 10.1109/WSCNIS.2015.7368291; Impact of Imperfect Channel Estimation on Successive Group Interference Cancellation Techniques.*

International Search Report and Written Opinion—PCT/US2016/067802—ISA/EPO—dated Mar. 20, 2017. 12 pages.

Dai Z., et al., "Improved Energy Detection with Interference Cancellation in Heterogeneous Cognitive Wireless Networks," IEEE Global Communications Conference (GLOBECOM), 2012, pp. 1550-1555.

Lee H., et al., "Interference Cancellation based on Blindly-Detected Interference Parameters for LTE-Advanced UE," IEEE International Conference on Communications (ICC)—Mobile and Wireless Networking Symposium, 2015, pp. 3143-3148.

* cited by examiner

TECHNIQUES FOR DETECTING AND CANCELLING INTERFERENCE IN WIRELESS COMMUNICATIONS

CLAIM OF PRIORITY UNDER 35 U.S.C. § 119

The present Application for Patent claims priority to Provisional Application No. 62/281,774 entitled "TECHNIQUES FOR DETECTING AND CANCELLING INTERFERENCE IN WIRELESS COMMUNICATIONS" filed Jan. 22, 2016, and Provisional Application No. 62/298,254 entitled "TECHNIQUES FOR DETECTING AND CANCELLING INTERFERENCE IN WIRELESS COMMUNICATIONS" filed Feb. 22, 2016, which are assigned to the assignee hereof and hereby expressly incorporated by reference herein for all purposes.

INTRODUCTION

Described herein are aspects generally related to communication systems, and more particularly, to detecting and cancelling interference in wireless communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. The wireless devices typically include a user equipment (UE), such as a mobile device, which communicates with a base station to receive access to a wireless network. Small cell base stations are provided as well to provide additional coverage areas. Small cell base stations are typically coupled to an Internet backend (e.g., at a residence, office building, etc.) and provide a frontend radio access network (RAN) interface. In some technologies, within a given cell of a base station or small cell base station, interference from devices outside of the cell (intercell interference) may limit throughput of devices within the cell.

Previous mechanisms for cancelling interference include interference aware maximum ratio combining (IRC) detection, where a total estimated noise can be cancelled from a received signal, but this mechanism may not work in environments having signal-to-interference ratio (SIR) below a threshold and/or at higher constellations. Another previous mechanism allows for communicating interferer information among base stations over a backhaul connection (e.g., an X2 interface in LTE). The backhaul connection, however, may not be guaranteed between any base stations (e.g., between any small cell base stations and/or between a small cell and macro cell base station), and thus may not be relied upon in all instances.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for cancelling interference in wireless communications is provided. The method includes performing energy level detection of a received signal to determine an allocation size and position corresponding to an interfering device in the received signal, determining an interference demodulation reference signal (DM-RS) and cyclic shift of the interfering device in the received signal, determining whether to apply successive interference cancellation on the received signal, based at least in part on the allocation size and position and the DM-RS and cyclic shift, to cancel interference from the interfering device, and applying the successive interference cancellation on the received signal based at least in part on determining to apply the successive interference cancellation.

In a further aspect, an apparatus for wireless communications is provided that includes a transceiver, a memory configured to store instructions, and one or more processors communicatively coupled with the transceiver and the memory. The one or more processors are configured to execute the instructions to perform an energy level detection of a received signal to determine an allocation size and position corresponding to an interfering device in the received signal, determine an interference DM-RS and cyclic shift of the interfering device in the received signal, determine whether to apply successive interference cancellation on the received signal, based at least in part on the allocation size and position and the interference DM-RS and cyclic shift, to cancel interference from the interfering device, and apply the successive interference cancellation on the received signal based at least in part on determining to apply the successive interference cancellation.

In another example, an apparatus for wireless communications is provided that includes means for performing an energy level detection of a received signal to determine an allocation size and position corresponding to an interfering device in the received signal, means for determining an interference DM-RS and cyclic shift of the interfering device in the received signal, means for determining whether to apply successive interference cancellation on the received signal, based at least in part on the allocation size and position and the interference DM-RS and cyclic shift, to cancel interference from the interfering device, and means for applying the successive interference cancellation on the received signal based at least in part on determining to apply the successive interference cancellation.

In yet another example, a computer-readable storage medium comprising computer-executable code for wireless communications is provided. The code includes code for performing an energy level detection of a received signal to determine an allocation size and position corresponding to an interfering device in the received signal, code for determining an interference demodulation reference signal (DM-RS) and cyclic shift of the interfering device in the received signal, code for determining whether to apply successive interference cancellation on the received signal, based at least in part on the allocation size and position and the interference DM-RS and cyclic shift, to cancel interference from the interfering device, and code for applying the successive interference cancellation on the received signal based at least in part on determining to apply the successive interference cancellation To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
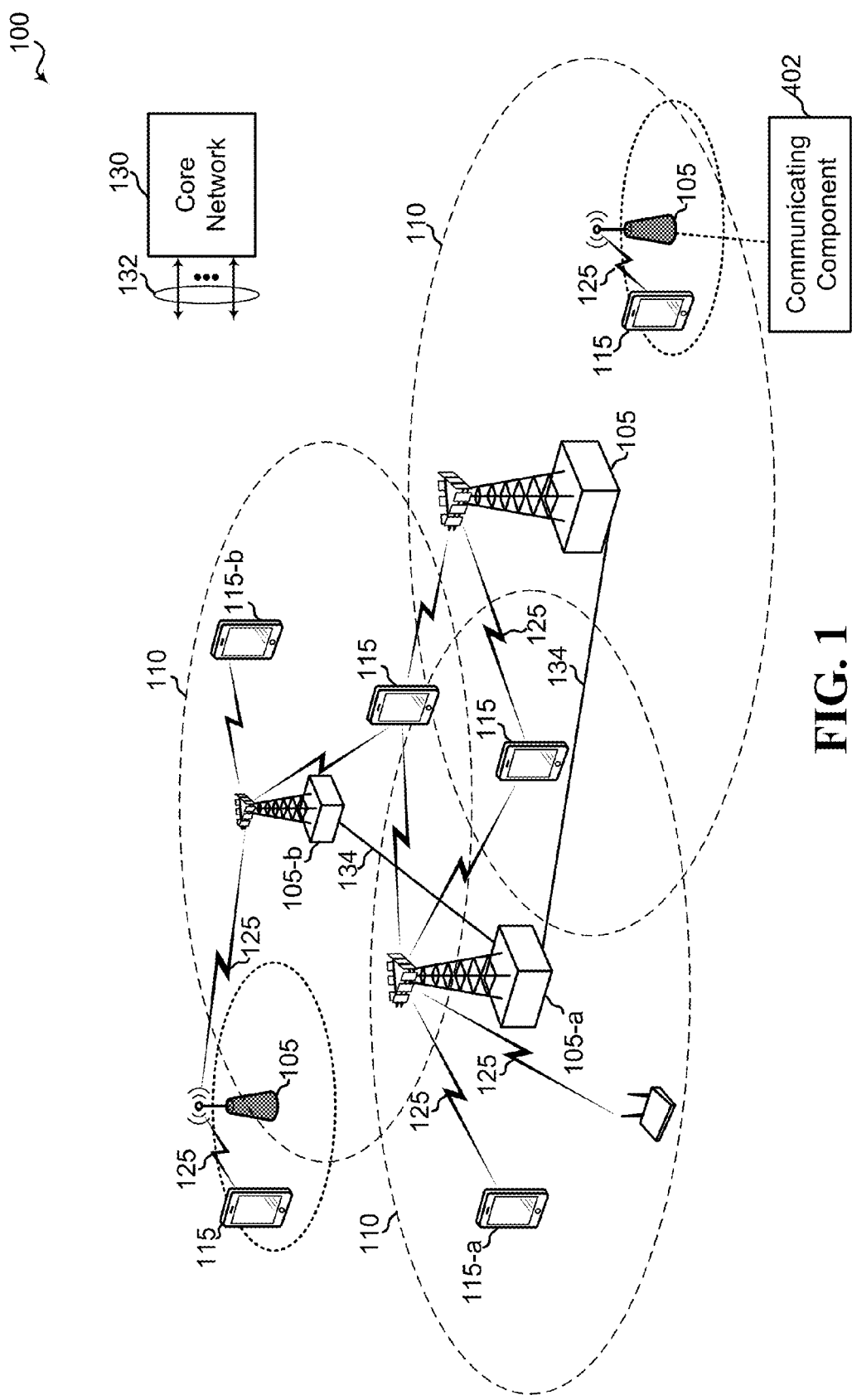
FIG. 1 shows a block diagram conceptually illustrating an example of a telecommunications system, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Described herein are various aspects related to performing blind detection of communications from one or more interfering devices to determine certain parameters of the one or more interfering devices (e.g., resource allocation size and/or position, channel coefficients, constellation etc.). Based on these parameters, for example, interference from the one or more interfering devices can be successively cancelled from received signals. In an example, an energy detection mechanism can be used to detect an interfering device in a received signal (e.g., to detect a size and/or position of a resource allocation). Based on detecting the interfering device, for example, a reference signal (RS) of the interfering device (and/or a corresponding cyclic shift of the RS) can be detected in the received signal based on a plurality of hypotheses corresponding to possible RS sequences (and/or corresponding cyclic shifts) defined in a radio access technology. For example, in LTE, a demodulation RS (DM-RS) can be detected in a received signal based on one of 60 possible DM-RS sequences (e.g., 60 for larger than 5 resource block (RB) allocations or 30 for equal or smaller than 5 RB allocations). In any case, coefficients corresponding to the interfering device can be computed based on the allocation size and/or position, and the detected RS and/or corresponding cyclic shift. The coefficients can be used (e.g., along with computed coefficients of the received signal) to cancel interference of the interfering device from the received signals (e.g., and/or subsequent received signals) using successive interference cancellation or other interference cancellation mechanisms.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, flash memory, phase change memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Referring first to FIG. 1, a diagram illustrates an example of a wireless communications system 100, in accordance with aspects described herein. The wireless communications system 100 includes a plurality of access points (e.g., base stations, eNBs, or WLAN access points) 105, a number of user equipment (UEs) 115, and a core network 130. Access points 105 may include a communicating component 402 configured to perform interference detection and/or cancellation in communications from other devices, in accordance with aspects described herein. Though shown as employed by an access point 105, substantially any wireless communication device (e.g., another small cell or macro access point 105, UE 115, etc.) may include and/or execute functions associated with a communicating component 402 to cancel interference of other devices, as described herein.

Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, femto, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A network communication systems, the terms evolved Node B (eNodeB or eNB) may be generally used to describe the access points 105. The wireless communications system 100 may be a Heterogeneous LTE/LTE-A network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may be provided by small cell base stations as low power nodes or LPNs. A macro cell may generally cover a relatively large geographic area (e.g., several kilometers in radius) and may allow unrestricted access by UEs 115 with service subscriptions with the network provider. A small cell may generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via one or more backhaul links 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, a station, an access terminal, a mobile terminal, a wireless terminal, a remote terminal, a handset, a user agent, a mobile client, a client, or some other suitable terminology. A UE 115 may be a cellular phone, a smart phone, a personal digital assistant (PDA), a wireless modem, a wireless communication device, a handheld device, a tablet computer, a laptop computer, a netbook, a smartbook, an ultrabook, a drone, a robot/robotic device, a cordless phone, a wearable item (such as a watch, glasses, bracelets, rings, wristbands, clothing, etc.), an entertainment device (e.g., music device, gaming device), cameras, monitors, meters, trackers, medical devices, vehicular devices, a wireless local loop (WLL) station, or the like. A UE 115 may be able to communicate with macro eNBs, small cell eNBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of one or more hierarchical layers which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), multiple connectivity (e.g., CA with each of one or more access points 105) or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

Each of the different operating modes that may be employed by wireless communications system 100 may operate according to frequency division duplexing (FDD) or time division duplexing (TDD). In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions.

As described herein, an access point 105 with a communicating component 402 can blindly detect interference in signals from one or more UEs 115. The interference may be caused by signals from other UEs (or other wireless communication devices), and may be blindly detected based on energy level detection, determining a known DM-RS in the signal, detecting an interference DM-RS and/or cyclic shift of a signal from the interfering device, etc. In any case, communicating component 402 may cancel the blindly detected interference from a received signal to facilitate improved decoding or other processing of the received signal.

Figure 2:
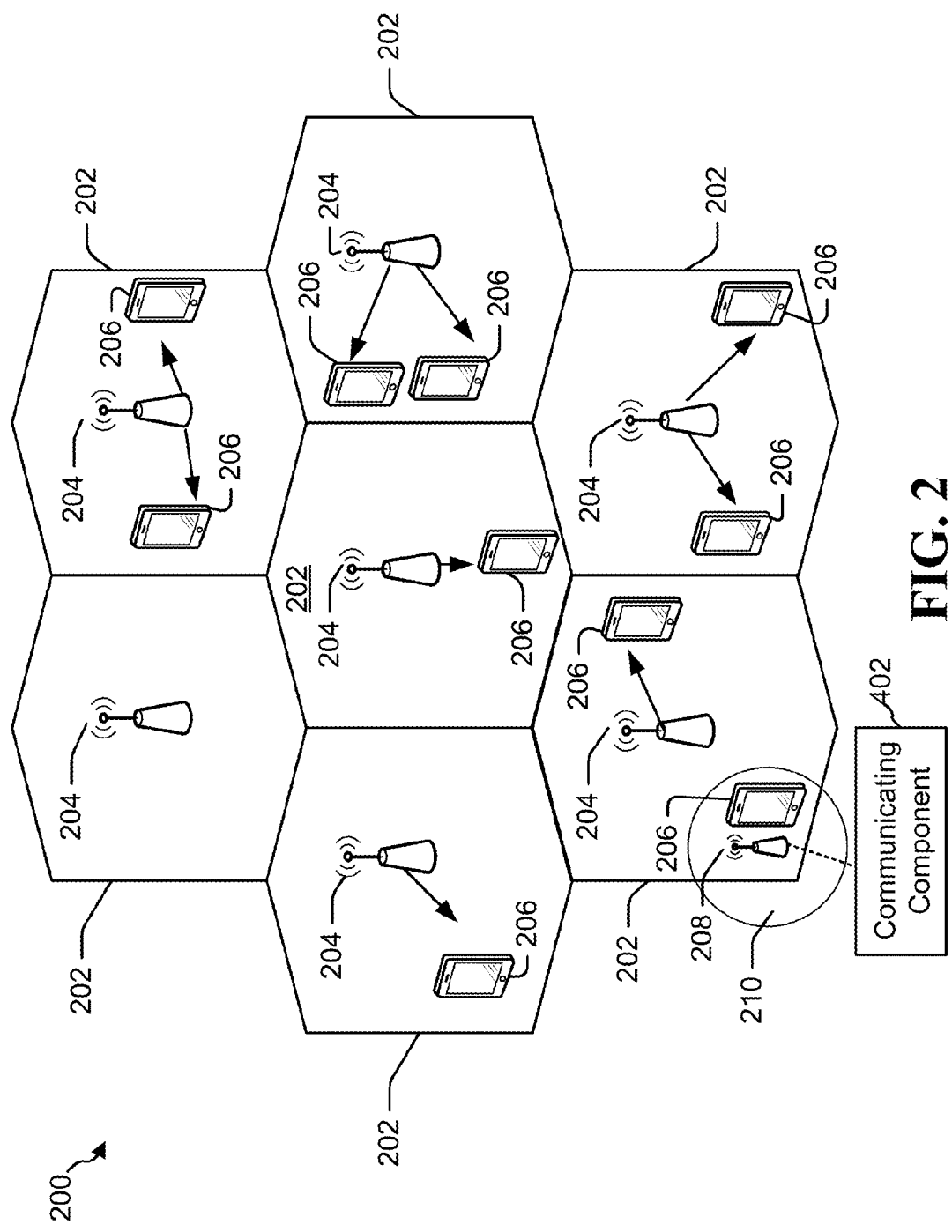
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more small cell eNBs 208 (e.g., eNBs of a lower power class than eNBs 204) may have cellular regions 210 that overlap with one or more of the cells 202. The small cell eNB 208 may be, for example, a femto cell (e.g., home eNB (HeNB)), pico cell, micro cell, or remote radio head (RRH), etc.). The macro eNBs 204 are each assigned to a respective cell 202 and are configured to provide an access point to the core network 130 for all the UEs 206 in the cells 202. Small cell eNB 208 can include a communicating component 402 configured to perform interference detection and/or cancellation in communications from other devices, in accordance with aspects described herein. Though shown as employed by a small cell eNB 208, substantially any wireless communication device (e.g., another small cell eNB or macro eNB 204, UE 206, etc.) may execute a communicating component 402 to cancel interference of other devices, as described herein. There is no centralized controller shown in this example of an access network 200, but a centralized controller may be used in alternative configurations. The eNBs 204 and/or 208 may be responsible for all radio related functions including radio bearer control, admission control, mobility control, scheduling, security, and connectivity to a serving gateway (not shown).

The modulation and multiple access scheme employed by the access network 200 may vary depending on the particular telecommunications standard being deployed. In LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 and/or 208 may have multiple antennas supporting MIMO technology. The use of MIMO technology enables the eNBs 204 and/or 208 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 and/or 208 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
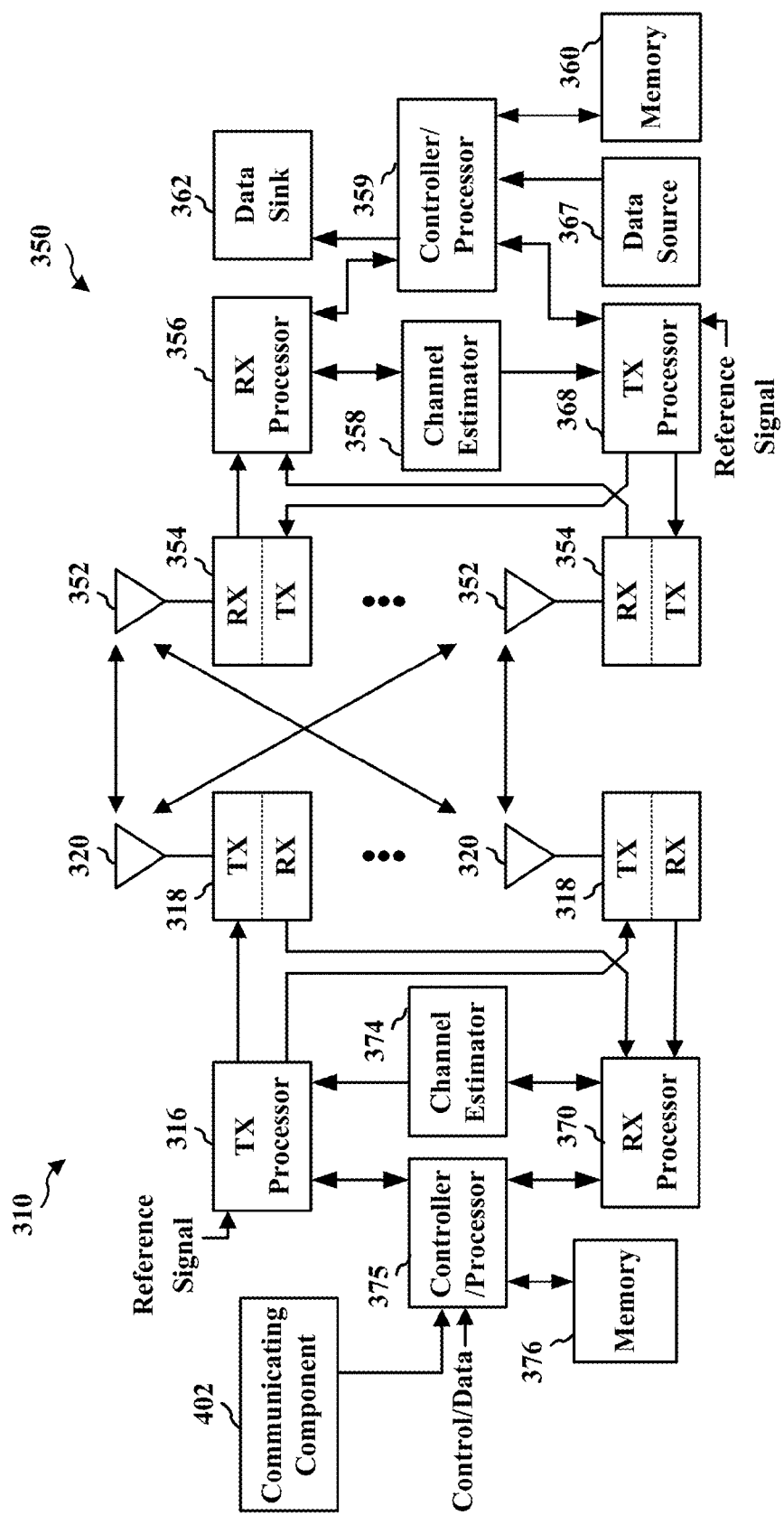
FIG. 3 is a diagram illustrating an example of an evolved Node B and user equipment in an access network.

FIG. 3 is a block diagram of an eNB 310 (e.g., access point 105, eNB 204, small cell eNB 208, eNB 440, eNB 450, eNB 460, etc.) in communication with a UE 350 (e.g., UE 115, 206, etc.) in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission. In addition, eNB 310 may include a communicating component 402 configured to perform interference detection and/or cancellation in communications from other devices, in accordance with aspects described herein. Though shown as employed by an eNB 310, substantially any wireless communication device (e.g., another eNB, UE 350, etc.) may execute a communicating component 402 to cancel interference of other devices, as described herein. For example, communicating component 402 can be implemented and/or executed by one or more processors, such as TX processor 316, RX processor 370, controller/processor 375, etc.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. The controller/processor 359 and/or other controllers and/or modules at UE 350 may direct operations of various techniques described herein (e.g., operations in connection with FIGS. 5A, 5B). In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. The controller/processor 375 and/or other controllers and/or modules at eNB 310 may direct operations of various techniques described herein (e.g., operations in connection with FIGS. 5A, 5B). In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
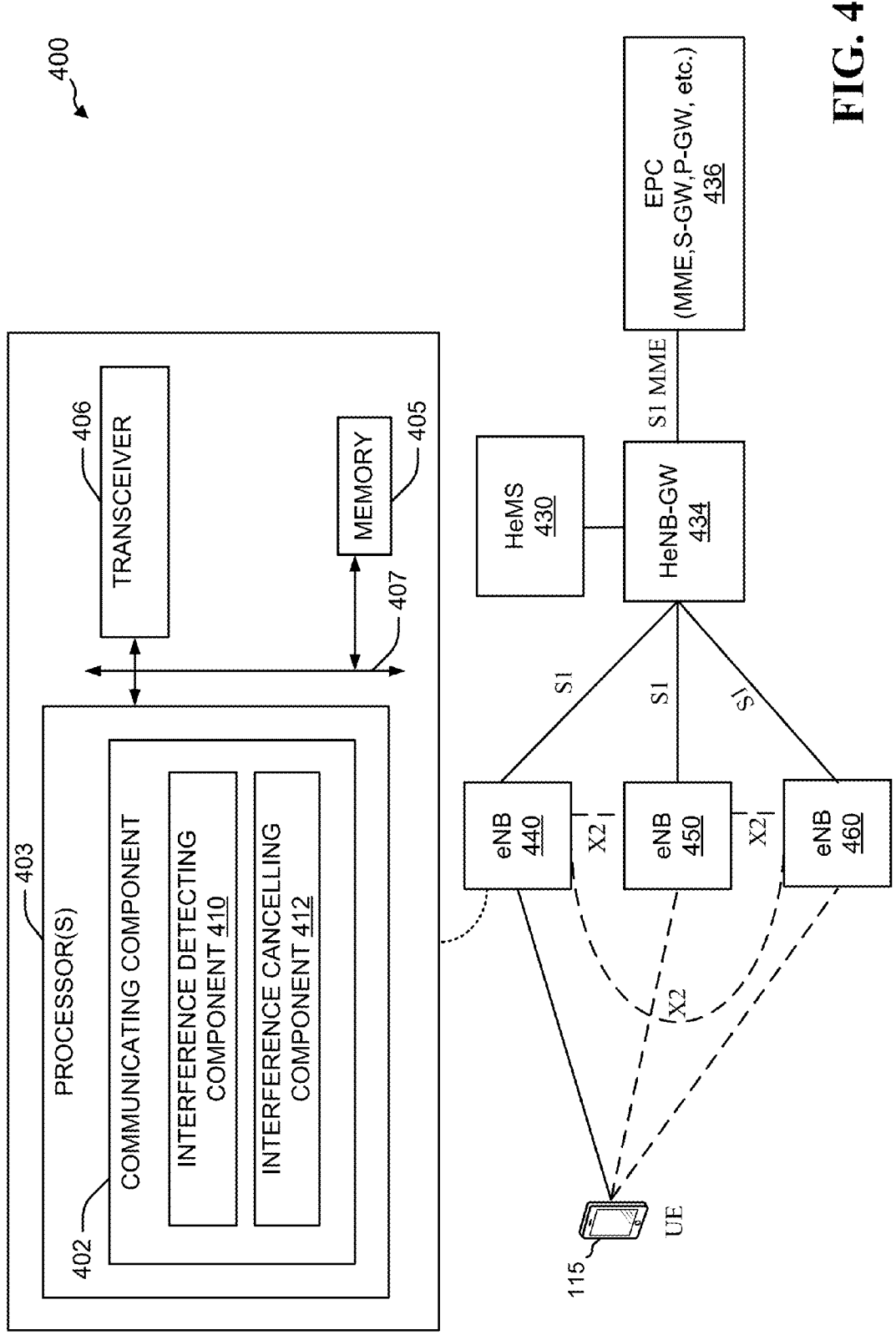
FIG. 4 is a diagram illustrating an example system for detecting and cancelling interference in accordance with aspects described herein.
Figure 5A:
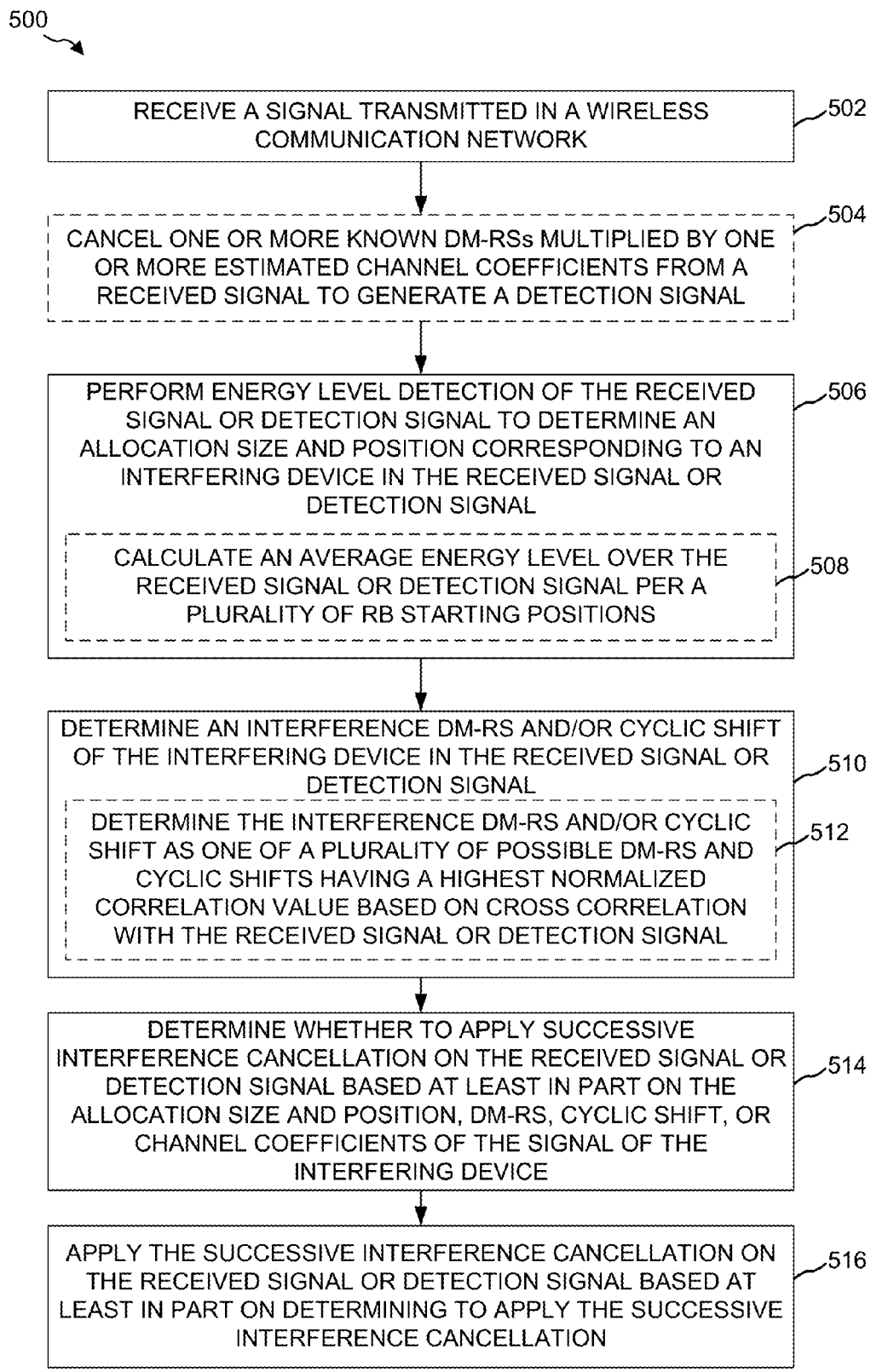
FIGS. 5A and 5B represent a flow chart of an example method of detecting and cancelling interference in accordance with aspects described herein.
Figure 5B:
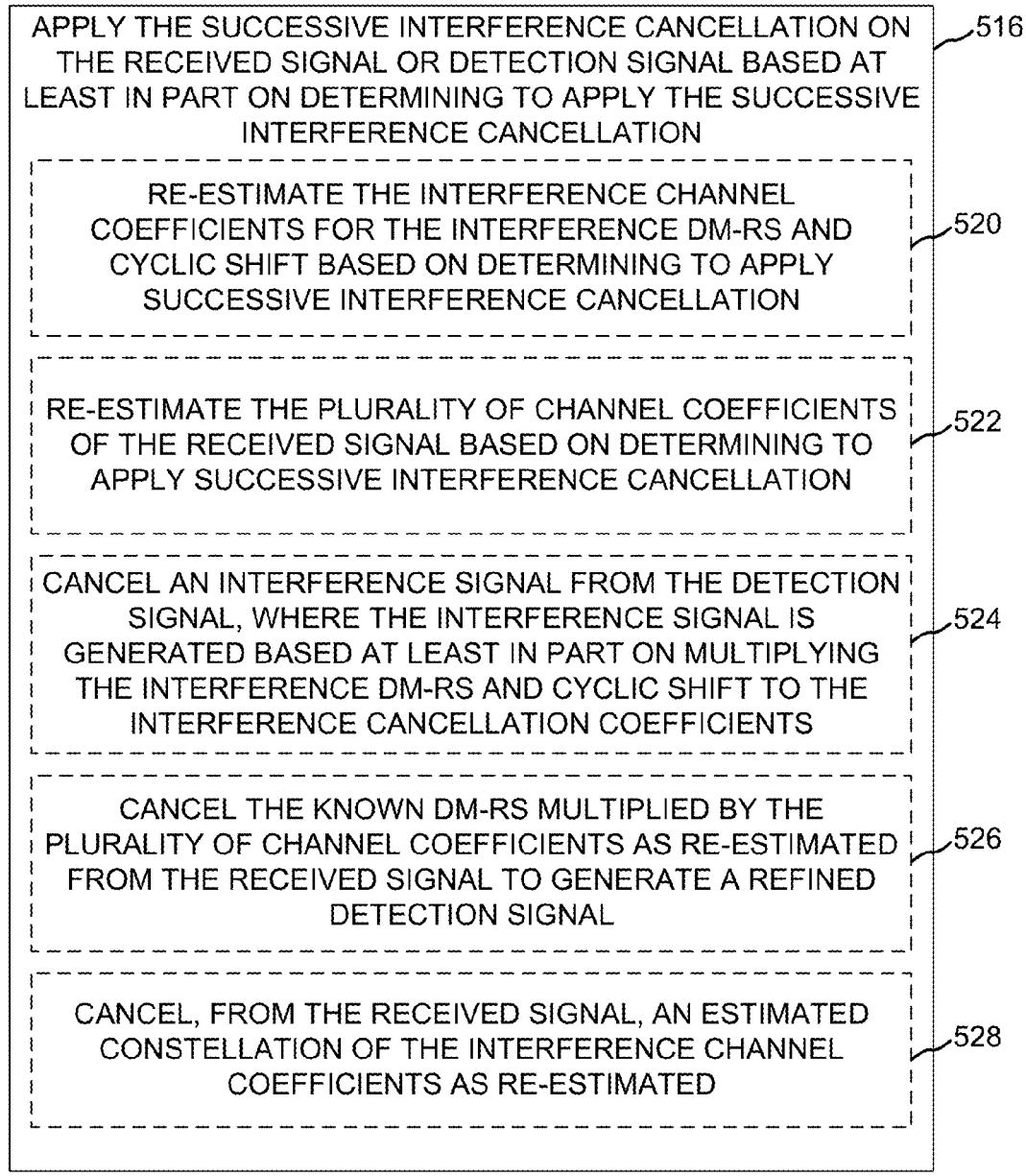

Referring to FIGS. 4-5B, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIGS. 5A and 5B are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

FIG. 4 is a block diagram conceptually illustrating an example of a network architecture 400, in accordance with aspects described herein. The network architecture 400 may be part of the wireless communications system 100 of FIG. 1, and may include a home eNB management system (HeMS) 430 capable of handling operation, administration, and management (OAM) of small cell base stations in a home network. The network architecture 400 may also include a home eNB gateway (HeNB-GW) 434, an evolved packet core (EPC) 436 (e.g., a core network, such as core network 130), and one or more eNBs 440, 450, 460. The eNBs 440, 450, 460 may be in communication with the HeNB-GW 434 via backhaul interfaces (e.g., an S1 interface). In an additional or an optional aspect, the eNBs 440, 450, 460 may communicate directly with EPC 436 via S1 interface. UE 115 can be in communication with one or more of eNBs 440, 450, 460. Additionally, the eNBs 440, 450, 460 may communicate with one another over backhaul interfaces (e.g., X2 interfaces). The HeNB-GW 434 and the EPC 436 may communicate via an S1 mobility management entity (MME) interface. The eNBs of FIG. 4 may correspond to one or more of the access points/eNBs described above with respect to FIGS. 1-3.

In an aspect, one or more of the eNBs 440, 450, 460 (though shown and described with respect to eNB 440 only for ease of explanation) may be configured to perform blind interference detection and/or cancellation thereof according to aspects described herein. Accordingly, eNB 440 may include one or more processors 403 and/or a memory 405 that may be communicatively coupled, e.g., via one or more buses 407, and may operate in conjunction with or otherwise implement a communicating component 402 configured to perform interference detection and/or cancellation in communications from other devices, in accordance with aspects described herein. Though shown as employed by eNB 440, substantially any wireless communication device (e.g., another eNB 450, 460, UE 115, etc.) may execute a communicating component 402 to cancel interference of other devices, as described herein. For example, the various operations related to communicating component 402 may be implemented or otherwise executed by one or more processors 403 and, in an aspect, can be executed by a single processor, while in other aspects, different ones of the operations may be executed by a combination of two or more different processors. For example, in an aspect, the one or more processors 403 may include any one or any combination of a modem processor, or a baseband processor, or a digital signal processor, or an application specific integrated circuit (ASIC), or a transmit processor, receive processor, or a transceiver processor associated with transceiver 406.

Further, for example, the memory 405 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 403. Moreover, memory 405 or computer-readable storage medium may be resident in the one or more processors 403, external to the one or more processors 403, distributed across multiple entities including the one or more processors 403, etc.

In particular, the one or more processors 403 and/or memory 405 may execute actions or operations defined by communicating component 402 or its subcomponents. For instance, the one or more processors 403 and/or memory 405 may execute actions or operations defined by an interference detecting component 410 for blindly detecting interference from one or more devices in a received signal (e.g., received by transceiver 406 via one or more related RF front end components). In an aspect, for example, interference detecting component 410 may include hardware (e.g., one or more processor modules of the one or more processors 403) and/or computer-readable code or instructions stored in memory 405 and executable by at least one of the one or more processors 403 to perform the specially configured interference detecting operations described herein. Further, for instance, the one or more processors 403 and/or memory 405 may execute actions or operations defined by an interference cancelling component 412 for cancelling detected interference from the received signal. In an aspect, for example, interference cancelling component 412 may include hardware (e.g., one or more processor modules of the one or more processors 403) and/or computer-readable code or instructions stored in memory 405 and executable by at least one of the one or more processors 403 to perform the specially configured interference cancelling operations described herein.

It is to be appreciated that transceiver 406 may be configured to transmit and receive wireless signals through one or more antennas, an RF front end, one or more transmitters, and one or more receivers. In an aspect, transceiver 406 may be tuned to operate at specified frequencies such that eNB 440 can communicate at a certain frequency. In an aspect, the one or more processors 403 may configure transceiver 406 to operate at a specified frequency and power level based on a configuration, a communication protocol, etc. to communicate uplink signals and/or downlink signals, respectively, over related uplink or downlink communication channels.

In an aspect, transceiver 406 can operate in multiple bands (e.g., using a multiband-multimode modem, not shown) such to process digital data sent and received using transceiver 406. In an aspect, transceiver 406 can be multiband and be configured to support multiple frequency bands for a specific communications protocol. In an aspect, transceiver 406 can be configured to support multiple operating networks and communications protocols. Thus, for example, transceiver 406 may enable transmission and/or reception of signals based on a specified modem configuration.

FIGS. 5A and 5B illustrate an example method 500 for blindly detecting interference and cancelling the interference (e.g., by a small cell eNB, macro eNB, UE, and/or substantially any device that supports wireless communications) in accordance with aspects described herein.

Method 500 can include, at Block 502, receiving a signal transmitted in a wireless communication network. In an aspect, communicating component 402, e.g., in conjunction with processor(s) 403, memory 405, and/or transceiver 406, can receive the signal transmitted in the wireless communication network. For example, communicating component 402 can receive the signal from UE 115. The signal as received by communicating component 402 may include interference from one or more other UEs (not shown), eNBs, etc., which may impact the ability of eNB 440 to properly decode the signal from the UE 115. In one example, UE 115 can transmit the signal to eNB 440 based on a radio access technology (RAT), such as LTE.

Method 500 may also optionally include, at Block 504, cancelling one or more known DM-RSs multiplied by one or more estimated channel coefficients from a received signal to generate a detection signal. In an aspect, communicating component 402, e.g., in conjunction with processor(s) 403 and/or memory 405, may cancel the one or more known DM-RS multiplied by the one or more estimated channel coefficients from the received signal to generate the detecting signal. For example, communicating component 402 may know the DM-RS based on assigning the DM-RS to UE 115 or otherwise receiving an indication of the DM-RS used by UE 115. In one example, where a received signal (e.g., RS) for a specific Rx antenna is denoted as $y_r(m)$, the main signal known DM-RS (with known cyclic-shift) is denoted by $D_Y(m)$, communicating component 402 may cancel the known main DM-RS (with known cyclic shift), as:

$$Q_r(m)=y_r(m)D_Y^*(m)$$

In this example, communicating component 402 may estimate a symbol timing offset (STO), denoted by $\Delta_r$, as:

$$\Delta_r = \frac{1}{p}\text{Angle}\left(\sum_{m=p+1}^{M} Q_r(m)Q_r^*(m-p)\right)$$

where p is some integer smaller or equal to the coherence BW of the channel, and M is a main signal allocation size (in subcarriers) corresponding to the received signal. In this example, communicating component 402 may cancel the STO, to get the per-subcarrier channel (with no STO), as:

$$H_{r,1}(m)=Q_r(m)e^{-j\Delta_r \cdot m}$$

In this example, communicating component 402 may average $H_{r,1}(m)$ as:

$$U_r(m) = \begin{cases} \frac{1}{T}\sum_{l=1+nT}^{(n+1)T} y_r(l)e^{-j\Delta_r \cdot l}D_Y^*(l) & \text{for } m=1+nT\left(n=0,1,\ldots,\frac{M}{T}-1\right) \\ U_r\left(1+\text{floor}\left(\frac{m-1}{T}\right)\right) & \text{else} \end{cases}$$

where T is the tile size (in subcarriers). In this example, communicating component 402 may perform cross tile smoothing (e.g., another filtering), to get $\hat{H}_{r,1}(m)$ for every Rx antenna r of the transceiver 406 and/or other transceivers of eNB 440 as:

$$\hat{H}_{r,1}(m) = \begin{cases} \sum_{s=-\frac{(L-1)}{2}}^{\frac{(L-1)}{2}} F(s)U_r(m-sT) & \text{for } m=1+nT\left(n=0,1,\ldots,\frac{M}{T}-1\right) \\ \hat{H}_{r,1}\left(1+\text{floor}\left(\frac{m-1}{T}\right)\right) & \text{else} \end{cases}$$

where L is a length of the smoothing filter (e.g., for the cross tile smoothing or other filtering), and estimate the plurality of channel coefficients by applying the STO, as:

$$\hat{\bar{H}}_{r,1}(m)=\hat{H}_{r,1}(m)e^{j\Delta_r \cdot m}$$

This may be referred to as a coarse channel estimation as existence of an interfering device is not taken into account. In this example, communicating component 402 can then regenerate the known DM-RS (also referred to herein as the "main signal DM-RS" or "main DM-RS") using the estimated channel coefficients and cancel out the main signal from the received signal. This post cancellation signal can be denoted as $R_r(m)$ and/or referred to as a "detection signal" herein.

Method 500 may also include, at Block 506, performing energy level detection of the received signal or detection signal to determine an allocation size and position corresponding to an interfering device in the received signal or detection signal. In an aspect, interference detecting component 410, e.g., in conjunction with processor(s) 403 and/or memory 405, may perform energy level detection of the received signal or detection signal to determine the allocation size and position corresponding to the interfering device in the received signal or detection signal. Thus, in an example, where the detection signal is generated at Block 504, energy level detection can be performed on this detection signal (and/or on the received signal in an additional or alternative example). In one example, performing the energy level detection at Block 506 may optionally include, at Block 508, calculating an average energy level over the received signal or detection signal per a plurality of resource block (RB) starting positions. In an aspect, interference detecting component 410, e.g., in conjunction with processor(s) 403 and/or memory 405, may calculate an average energy level over the received signal or detection signal per a plurality of RB starting positions.

For example, interference detecting component 410 may perform energy level detection based on determining, for each of the plurality of RB sizes (denoted by s), a winning start $A_{int}(s)$ and winning end $B_{int}(s)$ by maximum average energy over the RB positions (e.g., by determining contiguous RBs having the maximum average energy or at least having at least a threshold energy or at least a threshold energy difference from an adjacent RB), and calculating the maximum energy $E(s)=1, 2, \ldots, 34$. For each winning position, interference detecting component 410 may store (e.g., via memory 405) the two slopes $R_1(s)=P_{s,start}/P_{s,start-1}$ and $R_2(s)=P_{end-1}/P_{end}$ as well as save $G(s)=C_1E(s)+R_1(s)+R_2(s)$, where $C_1$ is a configurable parameter. In an example, interference detecting component 410 may then establish the winning size $\hat{s}$, by sorting the table containing $A_{int}(s)$, $B_{int}(s)$, $G(s)$, $R_1(s)$, $R_2(s)$ according to $G(s)$ and/or go over the sorted array, and prioritize each index based on: "priority 3"—if $R_1(s) \geq X$ and $R_2(s) \geq X$ and $A_{int}(S)==A_{main}$ and $B_{int}(s)==B_{main}$ (e.g., where slopes threshold passed, and main RB is completely overlapping interference RB), where $A_{main}$ and $B_{main}$ denote the start and end RBs, respectively, of the received signal (or detection signal); "priority 2"—if $R_1(s) \geq X$ and $R_2(s) \geq X$ and $\{(A_{int}(s)==A_{main}$ and $B_{int}(s)!=B_{main})$ or $(A_{int}(s)!=A_{main}$ and $B_{int}(s)==B_{main})\}$ (e.g., slopes threshold passed, and either main signal and interferer signal ending RBs, or main signal and interferer signal starting RBs overlap); "priority 1"—if $R_1(s) \geq X$ and $R_2(s) \geq X$ and $(A_{int}(s)!=A_{main}$ and $B_{int}(s)!=B_{main})$ (e.g., slopes threshold pass, and main signal and interferer signal ending RBs and starting RBs both do not overlap); or "priority 0"—Else (no slopes threshold passing). In this example, interference detecting component 410 may then go over the sorted array with priority indications, and determine the resource allocation size and/or position of the signal related to the interfering device by choosing the first "priority 1" index. If no such exist, interference detecting component 410 may determine the first "priority 2" index. If no such index exists, interference detecting component 410 may determine the first "priority 3" index. If no such index exists, interference detecting component 410 may determine the first "priority 0" index.

Method 500 may also include, at Block 510, determining an interference DM-RS and/or cyclic shift of the interfering device in the received signal or detection signal. In an aspect, interference detecting component 410, e.g., in conjunction with processor(s) 403 and/or memory 405, may determine the interference DM-RS and/or cyclic shift of the interfering device in the received signal or detection signal. For example, determining the interference DM-RS and/or corresponding cyclic shift thereof may allow for blindly detecting an interference signal in the received signal or the detection signal based on the DM-RS, as described further herein. For example, interference detecting component 410 may test one or more hypotheses of the DM-RS and/or cyclic shift along with the determined resource allocation position and/or size in attempting to determine the interference DM-RS and/or cyclic shift.

In an example, determining the interference DM-RS and/or cyclic shift at Block 510 may optionally include, at Block 512, determining the interference DM-RS and/or cyclic shift as one of a plurality of possible DM-RS and cyclic shifts having a highest normalized correlation value based on cross correlation with the received signal or the detection signal. In an aspect, interference detecting component 410, e.g., in conjunction with processor(s) 403 and/or memory 405, may determine the interference DM-RS and/or cyclic shift as one of the plurality of possible DM-RS and cyclic shifts having a highest normalized correlation value based on cross correlation with the received signal or the detection signal. For example, interference detecting component 410 may perform an exhaustive correlation of all possible DM-RS and/or cyclic shifts defined by the RAT (e.g., LTE) to determine the interference DM-RS and/or cyclic shift, as described below.

In an example, in performing an exhaustive correlation, interference detecting component 410 may, for each DM-RS hypothesis, calculate a correlation with the received signal or the detection signal, and determine the DM-RS and cyclic shift combination having the highest correlation as the interference DM-RS and cyclic shift. For example, for each DM-RS hypothesis (e.g., each of 60 hypotheses for allocation size larger than 5 RB in LTE or 30 hypotheses for allocation size less than or equal to 5 RB in LTE), interference detecting component 410 can perform cyclic shift detection of cyclic shifts $S_k$ (e.g., cyclic shift between 0 and 11). For example, interference detecting component 410 can cancel the DM-RS from the detection signal, where $A_k(M)$ is the DM-RS hypothesis (with no cyclic shift):

$$P_{r,k}(m) = R_r(m) A_k^*(m)$$

In this example, assuming Angle( ) output is in the semi-closed range $[0, 2\pi)$, interference detecting component 410 may then calculate a parameter $G_k$ as:

$$G_k = \text{Round}\left\{\frac{12}{2\pi}\left[\text{Angle}\left(\sum_{r=1}^{R}\sum_{m=2}^{M} P_{r,k}(m) P_{r,k}^*(m-1)\right)\right]\right\}$$

In this example, interference detecting component 410 may then calculate the cyclic shift as:

$$S_k = \begin{cases} G_k & \text{if } G_k \neq 12 \\ 0 & \text{else} \end{cases}$$

In this example, interference detecting component 410 may then cancel the cyclic shift as:

$$Q_{r,k} = P_{r,k}(m) e^{-j\frac{2\pi S_k}{12} \cdot m}$$

In this example, interference detecting component 410 may then calculate the STO $\Delta_{r,k}$ by:

$$\Delta_{r,k} = \frac{1}{p} \text{Angle}\left(\sum_{m=p+1}^{M} Q_{r,k}(m) Q_{r,k}^*(m-p)\right)$$

In this example, interference detecting component 410 may then cancel the STO, to get the per-subcarrier channel (with no STO) as:

$$H_{r,k,2}(m) = Q_{r,k}(m) e^{-j \cdot \Delta_{r,k} \cdot m}.$$

In this example, interference detecting component 410 can calculate average the per-subcarrier channel, as:

$$U_{r,k}(m) = \begin{cases} \frac{1}{T}\sum_{l=1+nT}^{(n+1)T} H_{r,k,2}(l) & \text{if } m = 1 + nT\left(n = 0, 1, \ldots, \frac{M}{T} - 1\right) \\ U_{r,k}\left(1 + \text{floor}\left(\frac{m-1}{T}\right)\right) & \text{else} \end{cases}$$

Interference detecting component 410 can also apply cross tile smoothing for each Rx antenna r, as:

$$\hat{H}_{r,k,2}(m) =$$

$$\begin{cases} \sum_{s=-\frac{(L-1)}{2}}^{\frac{(L-1)}{2}} F(s) U_{r,k}(m - sT) & \text{for } m = 1 + nT\left(n = 0, 1, \ldots, \frac{M}{T} - 1\right) \\ \hat{H}_{r,k,2}\left(1 + \text{floor}\left(\frac{m-1}{T}\right)\right) & \text{else} \end{cases}$$

In this example, interference detecting component 410 can compute a correlation $C_k$ for the cyclic shifted DM-RS based at least in part on:

$$C_k = \text{real}\left(\sum_{r=1}^{R}\sum_{m=1}^{M} R_r(m) e^{-j \cdot \Delta_{r,k} \cdot m} D_k^*(m) \hat{H}_{r,k,2}^*(m)\right)$$

$$= \text{real}\left(\sum_{r=1}^{R}\sum_{m=1}^{M} H_{r,k,2}(m) \hat{H}_{r,k,2}^*(m)\right)$$

where $$D_k^*(m) = e^{\frac{-2\pi j S_k}{12}m} A_k^*(m).$$

In this example, interference detecting component 410 can determine the winning DM-RS index W in the end of calculating $C_k$ for every DM-RS hypothesis, as:

$$W = \underset{k}{\operatorname{argmax}} C_k$$

and establish the winning DM-RS (with cyclic-shift) sequence as:

$$D_W(m) = e^{\frac{2\pi j S_W}{12}m} A_W(m)$$

In addition, interference detecting component 410 can establish the interferer channel coefficients as:

$$\hat{H}_{r,W,2}(m) = \hat{H}_{r,W,2}(m) e^{j \cdot m \cdot \Delta_{r,w}}$$

In another example, interference detecting component 410 may perform correlation for a set of determined possible DM-RS and/or cyclic shifts (e.g., not necessarily all possible DM-RS and/or cyclic shifts defined by the RAT) to determine the interference DM-RS and/or cyclic shift, as described below. Determining a set of possible DM-RS and/or cyclic shifts in this regard may reduce the amount of calculations involved in correlation with each reference sequence. Where the references sequences are Zadoff-Chu sequences (e.g., in LTE when the minimum number of RBs is 3), a second order differences signal can be used to determine the set of possible DM-RS and/or cyclic shifts. In using second order differences signal, $x_{r,m}$, which is the post FFT received signal in Rx antenna r, can be determined, in subcarrier m, as:

$$x_{r,m} = h_{r,m} e^{j2\pi\left[\frac{-m(m+1)}{2N_{zc}}q + \frac{c}{12}m + \frac{\Delta_{r,k}}{2\pi}m\right]} + n_{r,m}$$

where $h_{r,m}$, $n_{r,m}$ is the corresponding channel, and noise, m=0, . . . , M−1 (M is the hypothesized allocation size) and $N_{zc}$ is the smallest prime number smaller or equal to M, c=0, . . . , 11 is the cyclic shift, $\Delta_{r,k}$ is the STO, and q is defined by:

$$q = \operatorname{floor}\left(\frac{N_{ZC}(u+1)}{31} + 0.5\right) + v \cdot (-1)^{\operatorname{floor}\left(2\frac{N_{ZC}(u+1)}{31}\right)}$$

where for allocation sizes larger or equal to 5 RBs: u∈{0, . . . , 29} and v∈{0,1}, and for allocation sizes between 3 or 4 RBs: u∈{0, . . . , 29} and v=0. Using these calculations, the interference detecting component 410 can calculate the first order differences signal:

$$\dot{x}_m = \sum_{r=1}^{R} x_{r,m+1} x_{r,m}^* \cong \sum_{r=1}^{R} |h_{r,m}|^2 e^{j2\pi\left[\frac{-(m+1)}{N_{zc}}q + \frac{c}{12} + \frac{\Delta_{r,k}}{2\pi}\right]} + \hat{n}_m$$

for m=0, 1, . . . , M−2, and the second order differences signal:

$$\ddot{x}_m = \dot{x}_{m+1} \dot{x}_m^* \cong \left(\sum_{r=1}^{R} |h_{r,m}|^2\right)^2 e^{j2\pi\left[\frac{-q}{N_{zc}}\right]} + \hat{\hat{n}}_m$$

for m=0, 1, . . . , M−3. For all q hypothesis, q is an integer, and 0≤q≤N−×1, and there is no ambiguity in the second derivative. Accordingly, for different q values, the second derivative can have different constant phase (ignoring the noise). In an example, interference detecting component 410 can estimate q by first calculating:

$$\tilde{q} = -\frac{N_{zc}}{2\pi} \cdot \operatorname{Angle}\left(\sum_{m=0}^{M-3} \ddot{x}_m\right)$$

assuming Angle result is in the range: [0,2π). Interference detecting component 410 can then sort the hypothesis based on the circular distance from q:

$$e_k = |\min[\operatorname{mod}(q_k - \tilde{q}, N_{zc}), \operatorname{mod}(\tilde{q} - q_k, N_{zc})]|$$

In this example, interference detecting component 410 can move on with the closest s (s≥1) hypotheses:

$$q_{k_1}, q_{k_2}, \ldots, q_{k_s}$$

For these s hypothesis indices $k_1, \ldots, k_s$ interference detecting component 410 can determine the set of possible DM-RS and/or cyclic shifts, and can perform the cross correlation with the received signal or the detection signal to determine the DM-RS and cyclic shifts having a highest normalized correlation value (e.g., as described above with respect to exhaustive correlation). In this example, interference detecting component 410 can determine the interference DM-RS and/or cyclic shift as index W, and $\hat{H}_{r,W,2}(m)$ (the channel coefficients), as described. Using the reduced set of hypotheses in this regard can lower processing burden in determining the interference DM-RS and/or cyclic shift of the signal from the interfering device.

Method 500 may also include, at Block 514, determining whether to apply successive interference cancellation on the received signal or detection signal based at least in part on the allocation size and/or position, the DM-RS, the cyclic shift, and/or channel coefficients of the signal of the interfering device. In an aspect, interference detecting component 410, e.g., in conjunction with processor(s) 403 and/or memory 405, may determine whether to apply successive interference cancellation on the received signal or detection signal based at least in part on the allocation size (M interfere) and/or position, the DM-RS, the cyclic shift, and/or the abovementioned interferer channel coefficients $\hat{H}_{r,2}(m)$. For example, if the highest correlation value, described above, does not achieve a threshold, the interference may not have a significant impact on communications from UE 115, and may not need to be cancelled. For example, interference detecting component 410 may evaluate both the highest normalized correlation value ($C_{win}$), and the ratio of the highest normalized correlation value to one or more other next highest normalized correlation values ($C_{Second}$), which can be as follows:

$$\operatorname{function}\left(C_{win}, \frac{C_{win}}{C_{Second}}\right) \geq \operatorname{Threshold}\left(M_{interfere}, NoisePower\right)$$

In an example, interference detecting component 410 may change one or more parameters (e.g., the threshold) depending on the assumed allocation size of the interfering device and the noise power. If the above condition holds, in an example, interference detecting component 410 may determine to perform successive interference cancellation. In another example, interference detecting component 410 may determine whether to perform successive interference cancellation based on the normalized winning correlation by determining whether:

$$C'_W \geq \text{Threshold } (M_{interfere})$$

where:

$$C'_W = \frac{\text{real}\left(\sum_{r=1}^{R}\sum_{m=1}^{M} H_{r,w,2}(m)\hat{H}^*_{r,w,2}(m)\right)}{\sqrt{\left(\sum_{r=1}^{R}\sum_{m=1}^{M}|H_{r,w,2}(m)|^2\right)\left(\sum_{r=1}^{R}\sum_{m=1}^{M}|\hat{H}_{r,w,2}(m)|^2\right)}}$$

Thus, method 500 may also include, at Block 516, applying the successive interference cancellation on the received signal or detection signal based at least in part on determining to apply the successive interference cancellation. In an aspect, interference cancelling component 412, e.g., in conjunction with processor(s) 403 and/or memory 405, may apply the successive interference cancellation on the received signal or detection signal based at least in part on interference detecting component 410 determining to apply the successive interference cancellation. For example, interference cancelling component 412 may apply the successive interference cancellation based at least in part on determined channel coefficients of the received signal or detection signal and determined interference channel coefficients. In an example, the coefficients can be refined (e.g., re-estimated) based on determining to perform successive interference cancellation and before interference cancellation is performed.

Thus, referring to FIG. 5B, applying the successive interference cancellation at Block 516 may optionally include, at Block 520, re-estimating the interference channel coefficients for the interference DM-RS and cyclic shift based on determining to apply successive interference cancellation, and/or, at Block 522, re-estimating the plurality of channel coefficients of the received signal based on determining to apply successive interference cancellation. In an aspect, interference detecting component 410, e.g., in conjunction with processor(s) 403 and/or memory 405, may re-estimate the interference channel coefficients for the interference DM-RS and cyclic shift based on determining to apply successive interference cancellation, and/or re-estimate the plurality of channel coefficients of the received signal based on determining to apply successive interference cancellation.

In an example, interference detecting component 410 may re-estimate the channel coefficients and interference cancellation coefficients using a MMSE (minimum mean square error) operation, which may include a linear MMSE (LMMSE) operation. For example, interference detecting component 410 may apply a combined LMMSE estimation for both the channel coefficients and interference cancellation coefficients (and/or may apply LMMSE on subcarriers determined to overlap between the received or detection signal and interference from the interfering device). For example, where the originally received signal (before cancellation) within a certain tile for a specific Rx antenna r, can be represented as $\underline{y}_r$, the known DM-RS (with known cyclic shift) portion within the same tile can be represented as a vector $\underline{D}_Y$, the hypothesized interference DM-RS (with hypothesized cyclic-shift) portion within the same tile can be represented as $\underline{D}_W$, and $\underline{h}_r$ can represent the r-th row of the channel matrix H (corresponding to a signal received at Rx antenna r), joint LMMSE detection of both channels within this tile, for a specific Rx antenna r can be according to the following:

$$\underline{h}_r^T = \left((\underline{D}_Y, \underline{D}_W)^H(\underline{D}_Y, \underline{D}_W) + \frac{1}{NoisePow(r)}I\right)^{-1}(\underline{D}_Y, \underline{D}_W)^H \underline{y}_r$$

In addition, interference detecting component 410 may perform cross tile smoothing (or other filtering) to the resulting channel estimates. As described further herein, the resulting channel estimates can be used in applying successive interference cancellation.

In another example, interference detecting component 410 may re-estimate the channel coefficients and interference cancellation coefficients using successive channel estimation. In this regard, for example, applying the successive interference cancellation at Block 516 may also optionally include, at Block 524, cancelling an interference signal from the received signal, where the interference signal is generated based at least in part on multiplying the interference DM-RS and cyclic shift to the interference cancellation coefficients. In an aspect, interference detecting component 410, e.g., in conjunction with processor(s) 403 and/or memory 405, may cancel the interference signal from the received signal, where the interference signal is generated based at least in part on multiplying the interference DM-RS and cyclic shift to the interference cancellation coefficients (e.g., as generated in Block 512). For example, interference detecting component 410 can subtract the computed interference signal from the received signal. In this example, interference detecting component 410 may re-estimate the plurality of channel coefficients and interference channel coefficients of the interference-canceled signal, as described for the received signal or detection signal in Blocks 504 and/or 512, above. For example, applying the successive interference cancellation at Block 516 may also optionally include, at Block 526, cancelling the known DM-RS multiplied by the plurality of channel coefficients as re-estimated from the received signal to generate a re-estimated detection signal. In an aspect, interference detecting component 410, e.g., in conjunction with processor(s) 403 and/or memory 405, may cancel the known DM-RS multiplied by the plurality of channel coefficients as re-estimated from the received signal (e.g., as re-estimated from the interference-cancelled signal from Block 524) to generate the re-estimated detection signal. Interference detecting component 410 may then re-estimate interference channel coefficients over the re-estimated detection signal, as described in Blocks 510/512. In either case, the re-estimated (refined) channel coefficients and/or interference channel coefficients may be used in performing the successive interference cancellation.

In an example, applying successive cancellation at Block 516 in this regard may include performing one or more iterations of the Blocks in method 500. For example, method 500, or a portion of the related Blocks, may continue for one or more iterations (e.g., based on a configured number or iterations, based on a configured timer, based on detecting one or more events such as successive channel coefficients being within a threshold difference, etc). In an example, each iteration may include estimating of the channel coefficients of a received signal and canceling known DM-RS s multiplied by the channel coefficients at Block 504 for a given signal, re-estimating the channel coefficients of the other signal at Blocks 520 and 522, multiplying these coefficients by the other signal's DM-RS and cancelling this multiplication from the received signal at Block 524, and so on.

Figure 6:
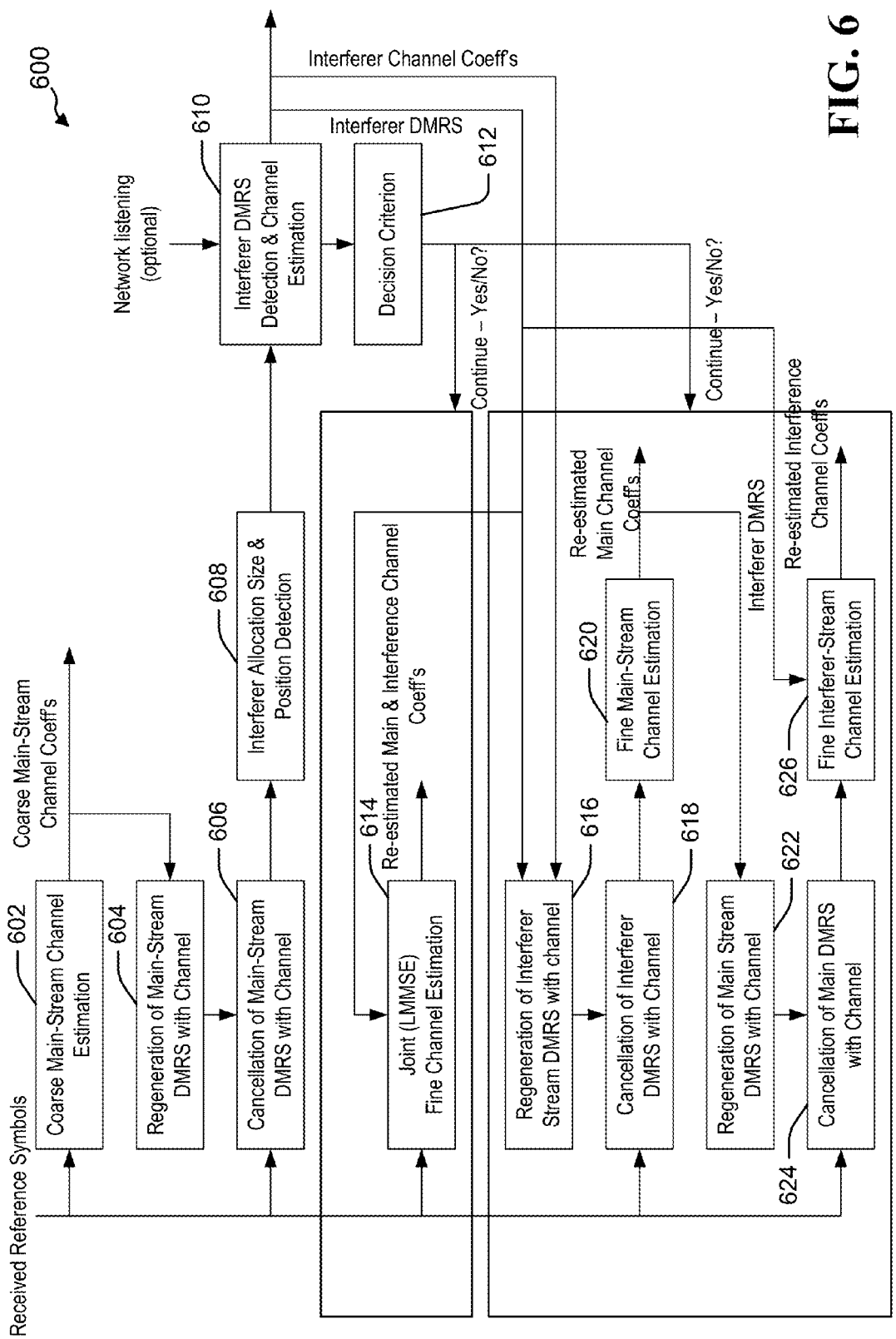
FIG. 6 is a diagram of an example process for detecting interference in accordance with aspects described herein.

An example process 600 in accordance with aspects described herein is shown in FIG. 6, where coarse main-stream channel estimation is performed over received reference symbols at 602 to generate coarse main-stream channel coefficients. In this example, the main-stream channel coefficients can refer to the channel coefficients of the expected signal from a UE. Process 600 includes, at 604, regeneration of main-stream DM-RS with the channel based on the main-stream channel coefficients, and cancellation of the main-stream DM-RS from the channel at 606. This can produce the detection signal (e.g., as described in Block 504 of method 500). Process 600 also includes interferer allocation size and position detection at 608, which can be detected from the detection signal (e.g., as in Block 506), and interferer DM-RS detection and channel estimation at 610 (e.g., as in Blocks 510 and 512). Based on detection criterion at 612, which may include one or more decisions based on the allocation size and position, DM-RS, cyclic shift, or channel coefficients of the signal of the interfering device, it can be determined whether to continue with the interference cancellation (e.g., as in Block 514). If so, the channel coefficients and/or interference channel coefficients can be re-estimated using joint (LMMSE) fine channel estimation at 614 to generate re-estimated channel coefficients (main-stream coefficients) and interference channel coefficients, which can correspondingly be used to cancel interference, as described herein. In another example, the channel coefficients and interference coefficients can be re-estimated based on cancellation of the interference DM-RS and fine stream channel estimation of the interference cancelled signal (e.g., as in Blocks 520, 522, 524, and/or 526). For example, process 600 can include regeneration of interferer stream DM-RS (e.g., the DM-RS determined for the signal from the interfering device) with the channel at 616, and cancellation of the interferer DM-RS with the channel at 618. Process 600 may also include fine main-stream channel estimation of the signal with the DM-RS of the interfering device removed at 620 to produce re-estimated main channel coefficients. Process 600 can additionally include regeneration of the main-stream DM-RS with channel at 622, and cancellation of the main DM-RS with the channel at 622. Process 600 may also include fine interferer stream channel estimation at 626 to produce re-estimated interference channel coefficients from the signal with the DM-RS of the intended signal removed. The re-estimated channel coefficients and/or interference channel coefficients can be used to apply successive interference cancellation, as described herein.

In an example, applying the successive interference cancellation at Block 516 may also optionally include, at Block 528, cancelling, from the received signal, an estimated constellation of the interference channel coefficients as re-estimated. In an aspect, interference cancelling component 412, e.g., in conjunction with processor(s) 403 and/or memory 405, may cancel, from the received signal, the estimated constellation of the interference channel coefficients as re-estimated. For example, interference cancelling component 412 may receive the re-estimated channel coefficients and/or interference channel coefficients from interference detecting component 410, and may accordingly cancel interference from the received signal and/or subsequently received signals from UE 115. As described further herein, cancelling the estimated constellation of the interference channel coefficients can occur in the data path of the received signal as opposed to the DM-RS symbol path where the coefficients are determined, as described above in earlier Blocks of method 500. In an example, cancelling the estimated constellation of the interference channel coefficients can include interference cancelling component 412 determining whether the received signal or interference is stronger, which can include determining which signal has the higher signal-to-noise ratio (SNR), reference signal received power (RSRP), reference signal received quality (RSRQ), etc., as described further with respect to FIG. 7, below.

Figure 7:
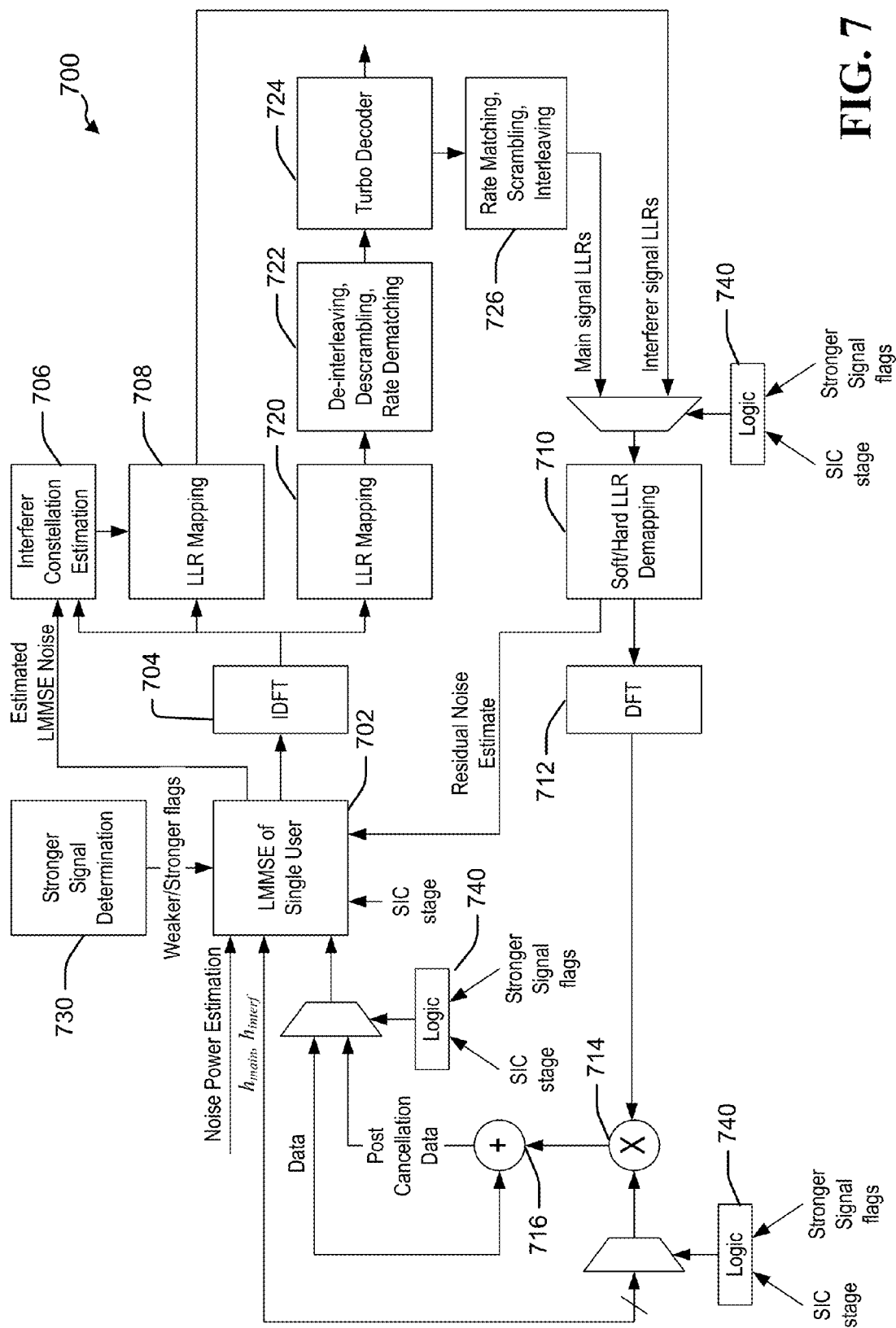
FIG. 7 illustrates example components for successively cancelling interference in accordance with aspects described herein.

FIG. 7 illustrates example components for process 700 for applying successive interference cancellation (e.g., by an interference cancelling component 412 based on received channel coefficients $h_{main}$ and interference channel coefficients $h_{interf}$). For example, if the interference signal is determined to be stronger at 730, interference cancelling component 412 can use the re-estimated interference channel coefficients (e.g., one of the output of interference detecting component 410 described above) as input to an LMMSE 702 equalization of the interference signal, the output of which can be input to an inverse discrete Fourier transform (IDFT) 704 and/or the estimated LMMSE noise (from LMMSE 702 and/or IDFT 704) can be input to an interferer constellation estimation 706. Moreover, for example, the IDFT 704 and/or interferer constellation estimation 706 output may be input to a log-likelihood ratio (LLR) mapping/demapping 708 mechanism, to calculate the interference symbols LLRs (e.g., with no turbo decoder). In this example, interference cancelling component 412 can then perform soft demapping of the LLRs of the signal from the interfering device (e.g., to a complex number) or perform hard demapping of the LLRs of the signal from the interfering device (e.g., to a constellation) at 710, perform a discrete Fourier transform (DFT) 712, and/or then multiply with the improved interference channel coefficients at 714. In this example, the interference cancelling component 412 can subtract the resulting signal from the received signal at 716 to create the detection signal (post cancellation data). In this example, the interference cancelling component 412 can then use LMMSE 702 to detect the received signal, IDFT 704, de-interleaver, descrambler, rate dematching 722, turbo decoder 724, etc., as described further herein, after which output data bits can be determined and/or successive interference cancellation can occur by taking the LLR output of the turbo decoder 724 and performing hard/soft demapping at 710, and so on.

If the received signal (also referred to as the main signal) is determined to be stronger at 730, interference cancelling component 412 can perform the reverse of the above-described process with the received signal to determine output data bits and/or perform successive interference cancellation based on LLR output. For example, in this case, interference cancelling component 412 can use improved main channel coefficients (one of the output of interference detecting component 410 described above) as input to an LMMSE 702 equalization of the main signal, and then perform an IDFT 704, de-interleaver, descrambler, rate dematching 722 (e.g., after LLR mapping 720), and turbo decoder 724 on the output. In this example, the interference cancelling component 412 can then can either stop with the output data bits, or continue with successive interference cancellation based on the LLR output of the turbo decoder (e.g., which may include rate matching, scrambling, interleaving 726 the LLR output of the turbo decoder 726), as described. The interference cancelling component 412 can then and perform soft/hard demapping 710 on the output, go through a DFT 712, then multiply the output with the improved main channel coefficients at 714, subtract from the received signal at 716, and continue with detecting the interferer signal, as described above, at LMMSE 702.

Specifically, in accordance with the aspects described with respect to FIG. 7, for example, interference cancelling component 412 may determine whether the received signal (e.g., main signal) or the interference signal is stronger at 730 by comparing frequency domain signal-to-noise ratio (SNR) of each stream, the fact that interfering signals are detected without turbo encoding gain—also known as hard decision loss—and constellation differences between the received signal and interference signal), and can decode starting with the stronger signal. For example, if the received signal is stronger, interference cancelling component 412 can perform LLR mapping 720 of the IDFT 704 output, de-interleaving, descrambling, and rate dematching 722 of the LLR mapping 720, apply a turbo decoder 724 to decode the received signal, and/or apply rate matching, scrambling, and interleaving 726 to generate the received signal LLRs. If the interference signal is stronger, interference cancelling component 412 can perform LLR mapping 708 of the IDFT 704 output in generating interference signal LLRs.

In an example, interference cancelling component 412 can perform soft/hard LLR demapping 710 of the received signal LLRs and/or the interference signal LLRs. For example, soft mapping can be done using the non-linear MMSE estimator:

$$\hat{s}(y) = E\{s \mid y\} = \sum_{i=1}^{S} s_i p(s = s_i \mid y) = \sum_{i=1}^{S} s_i \prod_{j=1}^{B} p(b_j = B_j(s_i) \mid y)$$

where y denotes the noisy constellation symbol, $\hat{s}(y)$ can be the demapper output, S can be the constellation size, $s_i$ can be the i-th constellation symbol, $E\{s|y\}$ can be the expectation of transmitted constellation symbol s given received noisy symbol y, P can be the theoretic probability, and B can be the number of LLRs per constellation symbol, and using:

$$p(b_j = B_j(s_i) \mid y) = \frac{e^{B_j(s_i) \cdot llr_j(y)}}{1 + e^{llr_j(y)}} = 0.5 \cdot (-1)^{1-B_j(s_i)} \cdot (1 + \tanh(0.5 \cdot llr_j(y)))$$

where $\{llr_j(y)\}|_{j=1}^{B}$ are the LLRs of the received noisy symbol y, yields:

$$\hat{s}(y) = \hat{s}(\{llr_j(y)\}|_{j=1}^{B}) = \sum_{i=1}^{S} s_i \prod_{j=1}^{B} 0.5 \cdot (-1)^{1-B_j(s_i)} \cdot (1 + \tanh(0.5 \cdot llr_j(y)))$$

and the estimated Mean Square Error for this estimator, denoted by $\sigma_I^2$ is:

$$\sigma_I^2 = E\{|\hat{s}(y) - s|^2\}$$
$$= E_y\{E\{|\hat{s}(y) - s|^2 \mid y\}\} = E_y\{E\{|s|^2 \mid y\} - |E\{s \mid y\}|^2\} = E_y\{\text{var}(s \mid y)\}$$

where:

$$\text{var}(s \mid y) = E\{|s|^2 \mid y\} - |E\{s \mid y\}|^2 =$$
$$\sum_{i=1}^{S} |s_i|^2 \prod_{j=1}^{B} p(b_j = B_j(s_i) \mid y) - |E\{s \mid y\}|^2$$
$$= \sum_{i=1}^{S} |s_i|^2 \prod_{j=1}^{B} 0.5 \cdot (-1)^{1-B_j(s_i)} \cdot (1 + \tanh(0.5 \cdot llr_j(y))) - |\hat{s}(y)|^2$$

and $\sigma_I^2$ can be calculated by averaging var(s|y) across data of the same OFDM symbol. In another example, interference cancelling component 412 can perform hard mapping of the LLRs based at least in part on applying a slicer on each LLR, where $$\text{Slicer}[x] = \begin{cases} -1 & \text{if } x \leq 0 \\ 1 & \text{else} \end{cases},$$

then using the same estimator on the sliced LLRs $\hat{s}(\{\text{Slicer}[llr_j(y)]\}|_{j=1}^{L})$. In the hard mapping case, it can be assumed $\sigma_I^2=0$. It can also be assumed unit variance of constellations symbols, and independency between the interferer and the main signals and the noise.

For example, interference cancelling component 412 can apply the LMMSE 702 based on the following:

$$s_{u_C}^{LB}(m) = (H^H(m)C_z(m)^{-1}H(m) + I)^{-1} \underline{\hat{h}}_{u_C}^{H}(m)C_z(m)^{-1}y(m)$$

Where H(m) represents the estimated channel matrix in subcarrier m, and $\underline{h}_u(m)$ represents its column $u \in \{u_C, u_N\}$, corresponding to the current detected interfering device, and next detected interfering device respectively, the input data signal for both Rx antennas is denoted as column $\underline{y}(m)$, and the interferer+noise correlation matrix as $C_z$. Thus, each overlapping subcarrier in the first iteration is:

$$C_z(m) = C_N(m) + \underline{h}_{u_N} \cdot \underline{h}_{u_N}^{H}$$

and each overlapping subcarrier in the next iteration is:

$$C_z(m) = C_N(m) + \underline{h}_{u_N} \cdot \underline{h}_{u_N} \cdot \sigma_I^2.$$

For every non overlapping subcarrier, it can be assumed that there is no interference except for the estimated noise, and so:

$$C_z(m) = C_N(m)$$

where $C_N(m)$ is the estimated noise for each subcarrier, and $\sigma_I^2$ is remaining noise which comes as output from the soft/hard LLR demapping 710, described above. In this example, an unbiased LMMSE 702 may be represented as:

$$s_{u_c}^{LU}(m) = \frac{s_{u_c}^{LB}(m)}{\sqrt{\frac{1}{M}\sum_{m=1}^{M}|(H^H(m)C_z(m)^{-1}H(m)+I)^{-1}\underline{h}_{u_c}^H(m)C_z(m)^{-1}\underline{h}_{u_c}(m)|^2}}$$

Or $$s_{u_c}^{LU}(m) = \frac{(H^H(m)C_z(m)^{-1}H(m)+I)^{-1}\underline{h}_{u_c}^H(m)C_z(m)^{-1}}{\sqrt{\frac{1}{M}\sum_{m=1}^{M}|(H^H(m)C_z(m)^{-1}H(m)+I)^{-1}\underline{h}_{u_c}^H(m)C_z(m)^{-1}\underline{h}_{u_c}(m)|^2}} \underline{y}(m)$$

$$\equiv W_{u_c}^{LU}(m)\underline{y}(m)$$

where M is $u_C$'s total allocation size, and 1 denotes the first subcarrier of its allocation. $W_{u_c}^{LU}$ can be a 1×R vector. The MSE of the linear estimator $W_u^{LU}(m)$, with channel $\underline{h}_u(m)$, and noise matrix $C_z(m)$, can be calculated as:

$$MSE(m) = W_u^{LU}(m)C_z(m)(W_u^{LU}(m))^H + |1 - W_u^{LU}(m)\underline{h}_u(m)|^2$$

In addition, for example, interference cancelling component 412 can determine whether the received signal or interference signal is stronger based on using the successive interference cancellation. As described, this can take into account the SNR of each signal, the constellation and code rate (e.g., the modulation and coding scheme (MCS)), and whether the signal can be detected using a turbo decoder. In another example, interference cancelling component 412 can determine whether the received signal or interference signal is stronger based on the SNR of each signal based on the following:

$$StrongerUser = \underset{u}{\mathrm{argmax}}\left\{\sum_{m=m_i}^{m_f}\|\underline{h}_u(m)\|^2\right\}$$

Where $m_i$ is the first overlapping subcarrier, and $m_f$ is the last overlapping subcarrier. In another example, interference cancelling component 412 can determine the interference signal as stronger, and should be detected first based on evaluating the calculated post-LMMSE equalization MSE (e.g., average of MSE(m) calculated in the IRC equalizer over the allocation subcarriers), and/or based on considering the decided constellation. For example, if the post-LMMSE equalization MSE achieves a threshold for 16-QAM, interference cancelling component 412 can determine the interference signal is stronger and may be detected first, or can otherwise determine the main signal is stronger, and accordingly continue successive interference cancellation, as described herein.

In addition, for example, for each interference signal from an interfering device, interference cancelling component 412 can estimate a constellation (e.g., using a maximum a posteriori (MAP) based constellation estimation algorithm to at least provide the interference signal constellation). For example, where Q represents a hypothesized constellation, N represents the number of subcarriers within the data buffer received, M(Q) represents the number of symbols in constellation, and P(Q|$\underline{y}$) represents the probability of the constellation Q given the noisy symbols vector $\underline{y}$, $$P(Q|\underline{y}) = \frac{P(Q)P(\underline{y}|Q)}{P(\underline{y})} =$$

$$\frac{P(Q)}{P(\underline{y})}\sum_{s\in Q^N}P(\underline{y}|Q,s)P(s|Q) = \frac{1}{(M(Q))^N}\frac{P(Q)}{P(\underline{y})}\sum_{s\in Q^N}P(\underline{y}|Q,s) =$$

$$\frac{1}{(M(Q))^N}\frac{P(Q)}{P(\underline{y})}\sum_{s_i\in Q}\prod_{i=1}^{N}P(y_i|Q,s_i) = \frac{1}{(M(Q))^N}\frac{P(Q)}{P(\underline{y})}$$

$$\prod_{i=1}^{N}\sum_{s_i\in Q}P(y_i|Q,s_i) = \frac{1}{(M(Q))^N}\frac{P(Q)}{P(\underline{y})}\prod_{i=1}^{N}\sum_{s_i\in Q}e^{-\frac{1}{N_0}|y_i-s_i|^2}$$

The MAP estimator can be:

$$Q_{MAP} = \underset{Q}{\mathrm{argmax}}\{P(Q|\underline{y})\} = \underset{Q}{\mathrm{argmax}}\{\ln[P(Q|\underline{y})]\}$$

$$= \underset{Q}{\mathrm{argmax}}\left\{\frac{1}{N}\ln(P(Q)) - \ln(M(Q)) + \frac{1}{N}\sum_{i=1}^{N}\ln\left(\sum_{s_i\in Q}e^{-\frac{1}{N_0}|y_i-s_i|^2}\right)\right\}$$

In another example, the following nearest neighbor approximation can be used:

$$Q_{NN} = \underset{Q}{\mathrm{argmin}}\left\{-\frac{1}{N}\ln(P(Q)) + \ln(M(Q)) + \frac{1}{N_0}\frac{1}{N}\sum_{i=1}^{N}|y_i - \mathrm{Slicer}(y_i)|^2\right\}$$

Additionally, some parts of the processes may have logic 740 defining behavior based on a stage of the successive interference cancellation (SIC) process and/or flags based on whether the interference signal or main signal is determined to be stronger, as described above.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. As used herein, a phrase referring to "at least one of" a list of items refers to any combination of those items, including single members and duplicate members. As an example, "at least one of: a, b, or c" is intended to cover: a, b, c, a-b, a-c, b-c, a-b-c, a-a-b, a-b-b-b-c, a-c-c, etc. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for cancelling interference in wireless communications, comprising:
    performing an energy level detection of a received signal to determine an allocation size and position corresponding to an interfering device in the received signal;
    determining an interference demodulation reference signal (DM-RS) and cyclic shift of the interfering device in the received signal;
    determining, based at least in part on the allocation size and position and the interference DM-RS and cyclic shift, whether to apply successive interference cancellation on the received signal to cancel interference from the interfering device; and
    applying the successive interference cancellation on the received signal based on determining to apply the successive interference cancellation.

2. The method of claim 1, wherein performing the energy level detection comprises calculating an average energy level of one or more energy levels detected over the received signal per a plurality of resource block start positions.

3. The method of claim 1, wherein determining the interference DM-RS and cyclic shift is based at least in part on:
    determining interference channel coefficients for each of a plurality of possible DM-RSs and cyclic shifts by cross correlation with the received signal; and
    determining the interference DM-RS and cyclic shift as one of the plurality of possible DM-RSs and cyclic shifts having a highest normalized correlation value based on the cross correlation with the received signal.

4. The method of claim 3, wherein determining whether to apply the successive interference cancellation is based at least in part on the highest normalized correlation value and a ratio of the highest normalized correlation value to a next highest normalized correlation of another one of the plurality of possible DM-RSs and cyclic shifts.

5. The method of claim 3, further comprising:
    estimating a plurality of channel coefficients of the received signal; and
    cancelling a known DM-RS multiplied by the plurality of channel coefficients from the received signal to generate a detection signal,
    wherein determining the interference DM-RS and cyclic shift of the interfering device is based on the detection signal.

6. The method of claim 5, wherein applying the successive interference cancellation comprises:
    re-estimating the interference channel coefficients for the interference DM-RS and cyclic shift based on determining to apply the successive interference cancellation on the received signal;
    re-estimating the plurality of channel coefficients of the received signal based on determining to apply the successive interference cancellation on the received signal; and
    applying the successive interference cancellation based at least in part on the plurality of channel coefficients and the interference channel coefficients as re-estimated.

7. The method of claim 6, wherein re-estimating the interference channel coefficients and re-estimating the plurality of channel coefficients is based on applying a joint minimum mean square error based on the known DM-RS and cyclic shift and the interference DM-RS and cyclic shift.

8. The method of claim 6, further comprising:
    generating a interference signal based at least in part on multiplying the interference DM-RS and cyclic shift to the interference channel coefficients for the interference DM-RS and cyclic shift; and
    cancelling the interference signal from the detection signal,
    wherein re-estimating the plurality of channel coefficients is based on the detection signal.

9. The method of claim 8, further comprising:
    cancelling the known DM-RS multiplied by the plurality of channel coefficients as re-estimated from the received signal to generate a re-estimated detection signal,
    wherein re-estimating the interference channel coefficients for the interference DM-RS and cyclic shift is based at least in part on the re-estimated detection signal.

10. The method of claim 6, wherein applying the successive interference cancellation is based at least in part on:
    estimating a constellation of the interference channel coefficients as re-estimated; and
    cancelling the constellation from the received signal.

11. The method of claim 3, further comprising determining the plurality of possible DM-RSs and cyclic shifts based at least in part on computing a second order differences signal of the received signal.

12. The method of claim 3, further comprising determining the plurality of possible DM-RSs and cyclic shifts as all possible DM-RSs and cyclic shifts defined by a corresponding radio access technology.

13. An apparatus for wireless communications, comprising:
    a transceiver;
    a memory configured to store instructions; and one or more processors communicatively coupled with the transceiver and the memory, wherein the one or more processors are configured to execute the instructions to:
- perform an energy level detection of a received signal to determine an allocation size and position corresponding to an interfering device in the received signal;
- determine an interference demodulation reference signal (DM-RS) and cyclic shift of the interfering device in the received signal;
- determine, based at least in part on the allocation size and position and the interference DM-RS and cyclic shift, whether to apply successive interference cancellation on the received signal to cancel interference from the interfering device; and
- apply the successive interference cancellation on the received signal based on the one or more processors determining to apply the successive interference cancellation.

14. The apparatus of claim 13, wherein the one or more processors are configured to execute the instructions to perform the energy level detection based on calculating an average energy level of one or more energy levels detected over the received signal per a plurality of resource block start positions.

15. The apparatus of claim 13, wherein the one or more processors are configured to execute the instructions to determine the interference DM-RS and cyclic shift based at least in part on:
- determining interference channel coefficients for each of a plurality of possible DM-RSs and cyclic shifts by cross correlation with the received signal; and
- determining the interference DM-RS and cyclic shift as one of the plurality of possible DM-RSs and cyclic shifts having a highest normalized correlation value based on the cross correlation with the received signal.

16. The apparatus of claim 15, wherein the one or more processors are configured to execute the instructions to determine whether to apply the successive interference cancellation based at least in part on the highest normalized correlation value and a ratio of the highest normalized correlation value to a next highest normalized correlation of another one of the plurality of possible DM-RSs and cyclic shifts.

17. The apparatus of claim 15, wherein the one or more processors are further configured to execute the instructions to:
- estimate a plurality of channel coefficients of the received signal; and
- cancel a known DM-RS multiplied by the plurality of channel coefficients from the received signal to generate a detection signal,
- wherein the one or more processors are configured to execute the instructions to determine the interference DM-RS and cyclic shift of the interfering device based on the detection signal.

18. The apparatus of claim 17, wherein the one or more processors are configured to execute the instructions to apply the successive interference cancellation based on:
- re-estimating the interference channel coefficients for the interference DM-RS and cyclic shift based on determining to apply the successive interference cancellation on the received signal;
- re-estimating the plurality of channel coefficients of the received signal based on determining to apply the successive interference cancellation on the received signal; and
- applying the successive interference cancellation based at least in part on the plurality of channel coefficients and the interference channel coefficients as re-estimated.

19. The apparatus of claim 18, wherein the one or more processors are configured to execute the instructions to re-estimate the interference channel coefficients and re-estimate the plurality of channel coefficients based on applying a joint minimum mean square error based on the known DM-RS and cyclic shift and the interference DM-RS and cyclic shift.

20. The apparatus of claim 18, wherein the one or more processors are further configured to execute the instructions to:
- generate a interference signal based at least in part on multiplying the interference DM-RS and cyclic shift to the interference channel coefficients for the interference DM-RS and cyclic shift; and
- cancel the interference signal from the detection signal,
- wherein the one or more processors are configured to execute the instructions to re-estimate the plurality of channel coefficients is based on the detection signal.

21. The apparatus of claim 20, wherein the one or more processors are further configured to execute the instructions to:
- cancel the known DM-RS multiplied by the plurality of channel coefficients as re-estimated from the received signal to generate a re-estimated detection signal,
- wherein the one or more processors are configured to execute the instructions to re-estimate the interference channel coefficients for the interference DM-RS and cyclic shift is based at least in part on the re-estimated detection signal.

22. The apparatus of claim 18, wherein the one or more processors are configured to execute the instructions to apply the successive interference cancellation is based at least in part on:
- estimating a constellation of the interference channel coefficients as re-estimated; and
- cancelling the constellation from the received signal.

23. The apparatus of claim 15, wherein the one or more processors are further configured to execute the instructions to determine the plurality of possible DM-RSs and cyclic shifts based at least in part on computing a second order differences signal of the received signal.

24. The apparatus of claim 15, wherein the one or more processors are further configured to execute the instructions to determine the plurality of possible DM-RSs and cyclic shifts as all possible DM-RSs and cyclic shifts defined by a corresponding radio access technology.

25. An apparatus for wireless communications, comprising:
- means for performing an energy level detection of a received signal to determine an allocation size and position corresponding to an interfering device in the received signal;
- means for determining an interference demodulation reference signal (DM-RS) and cyclic shift of the interfering device in the received signal;
- means for determining, based at least in part on the allocation size and position and the interference DM-RS and cyclic shift, whether to apply successive interference cancellation on the received signal to cancel interference from the interfering device; and means for applying the successive interference cancellation on the received signal based on the means for determining whether to apply successive interference cancellation determining to apply the successive interference cancellation.

26. The apparatus of claim 25, wherein the means for performing the energy level detection calculates an average energy level of one or more energy levels detected over the received signal per a plurality of resource block start positions.

27. The apparatus of claim 25, wherein the means for determining the interference DM-RS and cyclic shift determines the interference DM-RS and cyclic shift based on:
   determining interference channel coefficients for each of a plurality of possible DM-RSs and cyclic shifts by cross correlation with the received signal; and
   determining the interference DM-RS and cyclic shift as one of the plurality of possible DM-RSs and cyclic shifts having a highest normalized correlation value based on the cross correlation with the received signal.

28. A non-transitory computer-readable storage medium comprising computer-executable code for wireless communications, the code comprising:
   code for performing an energy level detection of a received signal to determine an allocation size and position corresponding to an interfering device in the received signal;
   code for determining an interference demodulation reference signal (DM-RS) and cyclic shift of the interfering device in the received signal;
   code for determining, based at least in part on the allocation size and position and the interference DM-RS and cyclic shift, whether to apply successive interference cancellation on the received signal to cancel interference from the interfering device; and
   code for applying the successive interference cancellation on the received signal based on the code for determining whether to apply successive interference cancellation determining to apply the successive interference cancellation.

29. The non-transitory computer-readable storage medium of claim 28, wherein the code for performing the energy level detection calculates an average energy level of one or more energy levels detected over the received signal per a plurality of resource block start positions.

30. The non-transitory computer-readable storage medium of claim 28, wherein the code for determining the interference DM-RS and cyclic shift determines the interference DM-RS and cyclic shift based on:
   determining interference channel coefficients for each of a plurality of possible DM-RSs and cyclic shifts by cross correlation with the received signal; and
   determining the interference DM-RS and cyclic shift as one of the plurality of possible DM-RSs and cyclic shifts having a highest normalized correlation value based on the cross correlation with the received signal.

* * * * *